(12) United States Patent
Arts et al.

(10) Patent No.: US 7,420,966 B2
(45) Date of Patent: Sep. 2, 2008

(54) CONNECTION CONTROL MODULE

(75) Inventors: Francis Luc Mathilda Arts, Arendonk (BE); Maria Jozef Huberte Coenen, Antwerp (BE); Hans Marcel Beatrijs De Vleeschouwer, Berchem (BE)

(73) Assignee: ALCATEL, Paris (FR)

( * ) Notice: Subject to any disclaimer, the term of this patent is extended or adjusted under 35 U.S.C. 154(b) by 1002 days.

(21) Appl. No.: 09/828,927

(22) Filed: Apr. 10, 2001

(65) Prior Publication Data

US 2001/0028646 A1    Oct. 11, 2001

(30) Foreign Application Priority Data

Apr. 11, 2000  (EP) ................... 00401006

(51) Int. Cl.
    H04L 12/50   (2006.01)
    H04Q 11/00   (2006.01)
(52) U.S. Cl. .................. 370/360; 370/261; 370/260; 370/352
(58) Field of Classification Search .......... 370/342, 370/360, 259, 260, 261, 262, 263, 271, 401, 370/352, 353; 709/227; 455/415, 416
    See application file for complete search history.

(56) References Cited

U.S. PATENT DOCUMENTS

| | | | | |
|---|---|---|---|---|
| 5,596,572 A | * | 1/1997 | Wille-Fier et al. | 370/360 |
| 5,623,488 A | * | 4/1997 | Svennevik et al. | 370/360 |
| 5,710,882 A | * | 1/1998 | Svennevik et al. | 709/227 |
| 6,108,705 A | * | 8/2000 | Svennevik et al. | 709/227 |
| 6,172,976 B1 | * | 1/2001 | Hino | 370/360 |
| 6,526,134 B1 | * | 2/2003 | Wallenius | 379/201.01 |
| 6,724,723 B1 | * | 4/2004 | Hamami | 370/230 |
| 6,769,026 B1 | * | 7/2004 | Casile et al. | 709/227 |

FOREIGN PATENT DOCUMENTS

EP      0 631 456 A2    12/1994
WO      WO 97/01911      1/1997

OTHER PUBLICATIONS

Malathi Veeraraghavan et al.: "Distributed Call Processing Architecture (DCPA)" Professional Program Proceedings of Electro International, US, New York, IEEE, Apr. 30, 1996, pp. 347-353, XP000634880 ISBN: 0-7803-3272-5.

* cited by examiner

Primary Examiner—Edan Orgad
Assistant Examiner—Ho Chuong
(74) Attorney, Agent, or Firm—Sughrue Mion, PLLC

(57) ABSTRACT

A connection control module of a switching node in a telecommunications network, and adapted to communicate to a service control module of the switching node is further adapted to communicate to at least one other connection control module of the switching node. This approach enables the establishment of connections at the physical level by linking half-call connections at this level.

11 Claims, 1 Drawing Sheet

CONNECTION CONTROL MODULE

BACKGROUND OF THE INVENTION

The present invention relates to a connection control module of a switching node in a telecommunications network, wherein the connection control module is adapted to communicate to a service control module of the switching node.

A connection control module is already known in the art, e.g., U.S. Pat. No. 5,623,488 entitled CALL SET-UP SERVER. Therein, a call set-up server is described, adapted to control call handling and connection handling. This call set-up server especially includes a connection handling module, indicated by 320 of FIGS. 3, 7, and 10 of this prior art document. This connection handling module has a service interface, indicated with 315 to a call handling module 310 shown in the same prior art figures. Since a call handling module can be considered as a service control module, the prior art connection handling module including a call handling interface to a call handling module can thus be considered as corresponding to a connection control module as described in the preamble of the first claim of this document.

A drawback of this approach is the lack of flexibility, mainly because of the full-connection approach in the presence of a half call control. This will be illustrated by means of the following example of a call forwarding service from a second to a third party. In the prior art case, two individual connections first need to be set up, a first one between a first and a second party; and a second one between this second and a third party. For the call-forwarding service from the first directly to the third party, a new connection between this first and third party is to be set up in the prior art system. This is quite difficult since a completely new connection handling module between the first and the third party is to be set up, based on information residing in the different central parts related to the first, second and third party. For other three-party supplementary services, the appropriate connection handling module is to be constructed each time, based on information to be gathered from a higher level, e.g., the central part. This is difficult and complex.

SUMMARY OF THE INVENTION

An object of the present invention is to provide a connection handling module of the above known type but wherein the above-mentioned problem of lack of flexibility is solved.

According to the invention, this object is achieved due to the fact that the connection handling module is further adapted to communicate via a connection control interface to at least one other connection control module of the switching node.

In this way, by the availability of a connection control interface to at least one other connection control module, these connection control modules can easily communicate with each other, so that the problem of establishing connections between the first and the third party, as was mentioned in the example, can now be easily realized by this communication between these different connection control modules, thereby eliminating the step of establishing a completely new connection control module between the first and the third party. Modularity and flexibility is thereby obtained. The connection control modules are thus also pertaining to a half-call model in addition to a full-call model.

The connection control module is further adapted to communicate with at least one other service control module of the switching node.

Thereby not only call handling services are controlling the connection plane, but other supplementary services such as three-party conference, hold for enquiry, enquiry and transfer, call waiting services can do this as well.

The connection control module further includes a service interface handler that is adapted to receive from the service control module a service request message to analyze the service request message and to perform an action, dependent on the result of the analysis of the service request message.

By the presence of the service interface handler, each connection control module is able to analyze and interpret incoming messages from the service control modules, and perform, based upon the analysis of them, specific actions. For example, in case the result of the analysis of the service request message indicates that at least one of a predetermined type of physical device drivers is needed for establishing a connection pertaining to a call, the action consists of generating a physical device interface handler module associated to the predetermined type of the physical device drivers for inclusion in the connection control module.

Thereby a physical device interface handler module is created by the service interface handler, in case the interpretation of the incoming message indicates that a particular type of physical device driver is needed. Physical device drivers are needed for setting up a physical connection, and are included in the switch.

The physical device interface handler will accordingly try to connect itself to such a type of physical device driver by the aid of a resource manager module which will first search for an appropriate type of physical device driver. Specifically, the physical device interface handler module transmits, to an associated resource manager module included in the switching node, a resource request message. The associated resource manager module selects a physical device driver from a plurality of physical device drivers of said predetermined type that are included in or coupled to the switching node based upon the resource request message. The chosen physical device driver is accordingly activated by the physical device interface handler module, which action is further confirmed towards the service interface handler and the service control module which originally transmitted the service request message.

Other types of messages, leading to other actions to be performed by the service interface handler, are described. If the result of the analysis of the service request message indicates that a physical device driver of the switching node is to be removed from an existing call connection, an existing physical device interface handler module associated to the physical device driver and included within the connection control module is deleted. If the result of the analysis of the service request message indicates that a physical device driver of the switching node is to be modified, a state change within an existing physical device interface handler associated to the physical device driver and included within the connection control module is initiated.

Thereby either an existing physical device interface handler module is either removed or deleted from the connection control module, or respectively modified.

If the result of the analysis of the service request message indicates that at least one other connection control module is involved, the service interface handler is further adapted to communicate to a service interface handler of the at least one other connection control module.

In this case, the service request message gives an identification of at least one other connection control module which is to be coupled to the present one, the service interface handler which receives this service request message will then start communicating with the service interface handler included in the other connection control module involved.

Furthermore, in case a connection at the physical level between two respective device drivers each coupled to both respective connection control modules is to be made, the first service interface handler will then send a message to a physical device interface handler of the same connection control module. The reference to this physical device interface handler as well being included in the service request message. This physical device interface handler will next start communicating with the appropriate physical device interface handler included in the connection control module to be linked. In this way, the connection will be realized at the lower physical level through this communication between the indicated physical device interface handlers.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
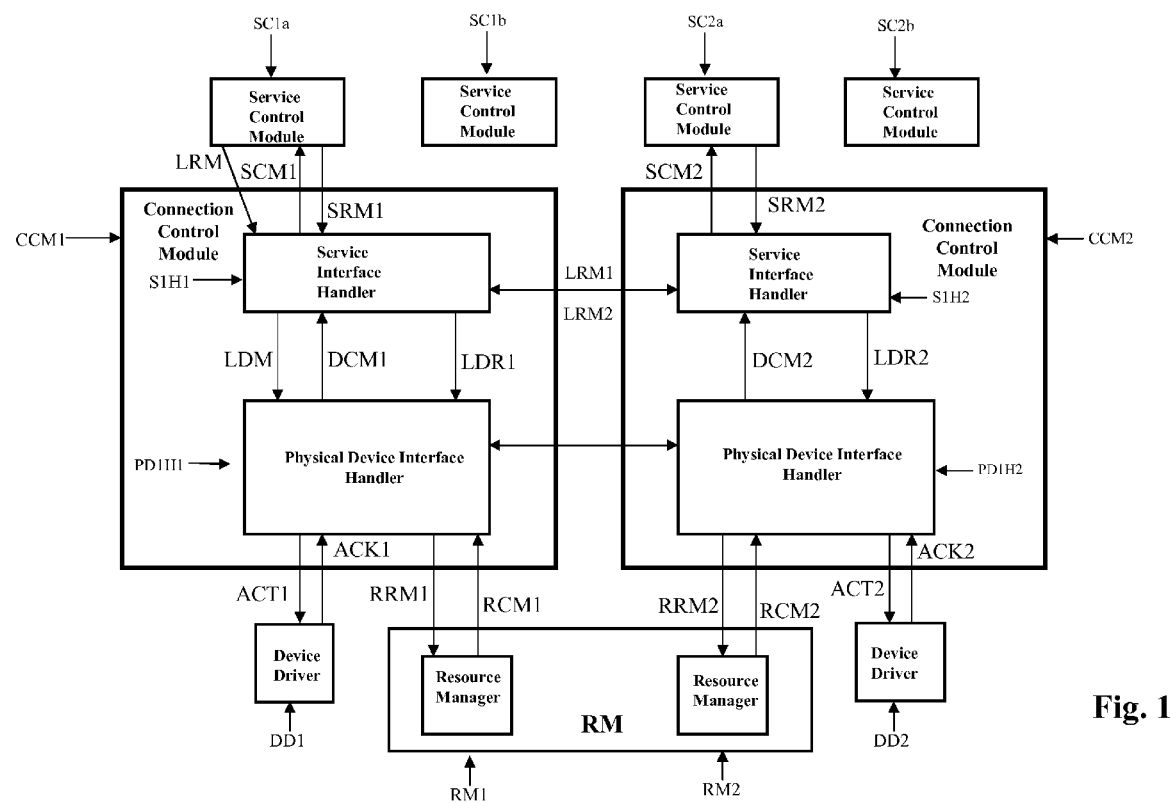
FIG. 1 describes an embodiment of two connection control modules according to the invention.

Connection control is dealing with the provision of a bearer service, provided via the control plane. The present connection control module is in charge of providing the bearer service within a switching node of a telecommunications network. The connection plane control as such can thereby be decomposed in several layers: the connection control layer itself, controlled by the present connection control module, the device handler layer which includes the different device handlers such as echo cancellers, dynamic integrated announcement modules, modems, etc. Above the connection control layer, the clients of the connection control module, i.e., the service control modules such as call control modules but also further services, are situated. As such, the connection control module has an abstract or logical interface with these service control modules, and a physical interface with the device handlers.

An essential feature of the connection control module of the present invention is that it pertains not only to a full call in case the service control layer is a call control layer, but also to a half call. This reflects itself by the fact that such a connection control module is adapted to communicate to another, similar, connection control module. Both communicating connection control modules are thereby both pertaining to a half call, such as the call control modules communicating with each of them. This has an enormous advantage in that the originating and terminating service control or (half) call control modules of the complete call each have their own halfside view of what is going on in the connection plane. The same of course holds for other service control modules which are the clients of this connection control module.

This architecture is shown in FIG. 1 where two of such connection control modules, CCM1 and CCM2 respectively, are depicted. In FIG. 1, CCM1 is communicating with service control module SC1a, but also is adapted to communicate to another service control module denoted SC1b. Similarly, CCM2 is communicating with service control module SC2a, and is further adapted to communicate to a fourth service control module denoted SC2b. At the bottom level of the physical layer, CCM1 is communicating with physical device driver DD1, whereas CCM2 is communicating with physical device driver DD2; both devices being physical device handlers or drivers.

Within such a connection control module two main blocks can be discriminated: a service interface handler, SIH1 and SIH2, respectively, for CCM1 and CCM2, and a physical device interface handler denoted PDIH1 and PDIH2, respectively, for CCM1 and CCM2. Whereas the service interface handlers are permanently available as modules in the connection control module, these physical device interface handlers are not permanently available within the connection control modules, but are created by the service interface handlers themselves, on the basis of requests the latter receive from the service control modules. These physical device interface handlers may not only be created by the service interface handlers, existing ones may also be deleted by these service interface handlers, or modified by them, always in response to the contents of the messages exchanged between the service control modules and the service interface handler modules.

This will now be illustrated by means of the example depicted in the figure. In a first phase, both connection control modules, CCM1 and CCM2, independently of each other, receive a first message, denoted SRM1, SRM2 respectively, from one of their service control modules: SC1a and SC2a, respectively. These messages are called service request messages since these originate from the service control module and contain information with respect to which service is asked, such as connect subscriber X, or connect to tone Y, or connect to another half-call connection, or connect a conference mixer, etc. The respective service interface handing modules SIH1 and SIH2 are adapted to receive these messages and to analyze them. Dependent upon the result of this analysis, specific actions will be undertaken. In the example that a call is to be set up between a party coupled to or controlled by SC1a, SRM1 will be a "add party request", and the resulting action will be that a physical device interface handler, denoted PDIH1, will be created by the service interface handler SIH1. Once this physical device interface handler is created, SIH1 will send to it a link device request message, denoted LDR1, indicating that a physical device driver, in the example of the half call being the line termination card the party is connected to if this party is a local subscriber in the node, is to be searched for. The PDIH1 accordingly transmits a resource request message, denoted RRM1 to a resource manager module of the switch. Such a resource manager module RM is able to select from a plurality of physical device drivers, an appropriate one based on the contents in the resource request message, and give an identifier of the selected device driver via a resource confirmation message RCM1, back to the PDIH1. In the embodiment depicted in FIG. 1 the resource manager RM includes several blocks, such as RM1 and RM2 amongst others that are not shown, whereby each is communicating to a different connection control module. In however other embodiments this is not the case.

Once the physical device interface handler PDIH1 receives the resource confirmation message RCM1, it can thereby seize the corresponding device driver, in the example being DD1 and thus representing a device driver for a line termination card. PDIH1 therefore transmits an activation message ACT1 to DD1, thereby activating this physical device driver, whereby the latter responds by an acknowledgement message ACK1 to PDIH1. The physical device interface handler PDIH1 accordingly transmits a device confirmation message DCM1 to the service interface handler SIH1, which further transmits a service confirmation message SCM1 to SC1a, indicating that an appropriate physical device is now operative and linked to the connection control module CCM1.

For the other part of the half call, ordered by SC2*a*, similar operations had taken place, possibly concurrently or not, entirely dependent on the control of SC2*a*. Thus, SC2*a* had generated a service request message SRM2 to SIH2. Upon analysis of this service request message, SIH2 had generated an appropriate physical device interface handler PDIH2, which further received link device request message LDR2 from SIH2, for thereby assessing the resource manager RM by means of resource request message RRM2. In the depicted embodiment, RM again included a specific part dedicated to CCM2. This specific part, denoted RM2 thereby selected an appropriate device driver DD2, from which it included its identity in a resource confirmation message RCM2, sent back to PDIH2. The physical device interface handler PDIH2, upon receipt of RCM2, starts activating DD2 by means of an activating message ACT2, which action was confirmed by DD2 back to PDIH2 by means of an acknowledgement ACK2. This activation is further communicated upwards to the service interface handler module SIH2, via device confirmation message DCM2, and further to the service control module via service confirmation message SCM2.

Once both half-call connections are established, via a respective assessment of a line termination card or a trunk termination card, dependent on whether the subscribers under consideration were locally connected or not, both need to be linked. This may occur first at the service level by means of another service request message denoted LRM, in the example depicted in the figure being generated by the service control module SC1*a* coupled to the first connection control module CCM1. However, this may also occur on request of the service control module SC2*a* coupled to the second connection control module CCM2. This service request message indicates that CCM2 and CCM1 and, at a lower layer DD1 and DD2, are to be connected or linked to each other. Upon receipt of LRM by SIH1, the latter service interface handler will generate a link request message LRM1 to the service interface handler SIH2 of the second connection control module CCM2, thereby further indicating that a connection is to be made between DD1 and DD2. SIH2 confirms this message by replying to SIH1 via message LRM2. Furthermore SIH1 transmits a link device message LDM to PDIH1, which in its turn may start communicating with the indicated physical device interface handler PDIH2 of CCM2. This communication is however optional and is indicated in the figure by the double-sided arrow between PDIH1 and PDIH2. However, both PDIH1 and PDIH2 may in another variant of the method be assessed by respectively SIH1 and SIH2, which activate the respective device drivers as to link the hardware devices coupled to it. These actions are again confirmed by means of confirm messages from the device drivers to the physical device interface handlers to the service interface handlers to the service control modules. In order not to overload the drawing further, these messages are not shown. At this moment a full call connection, consisting of two half-call connections that are mutually linked, is established.

Other messages generated by the service control modules may however indicate that existing physical device interface handlers have to be modified. This occurs for instance for the service "call waiting" whereby a tone generating device needs to be accessed, to be activated and to be connected to the other party in order to communicate to this party that a first party wanted to contact it.

In other cases, the message generated by the service control module and received by the service interface handler may indicate that an existing physical device interface handler is to be removed. This is the case for the above-mentioned example of "call waiting" service whereby after a predetermined time this tone generating device is to be removed again from the connection.

While the principles of the invention have been described above in connection with specific apparatus, it is to be clearly understood that this description is made only by way of example and not as a limitation on the scope of the invention, as defined in the appended claims.

The invention claimed is:

1. A switching node in a telecommunications network, comprising:
    a first service control module for issuing a first service request message containing information regarding a requested service;
    a first connection control module having a first service interface receiving said first service request message from said first service control module and for sending a first link request message, and having a first physical device interface module responsive to said first link request message for establishing connection to a first physical device,
    a second service control module for issuing a second service request message containing information regarding a requested service;
    a second connection control module having a second service interface receiving said second service request from said second service control module and for sending a second link request message, and having a second physical device interface module responsive to said second link request message for establishing connection to a second physical device, and
    a communication channel between said first and second connection control modules by which one of said first and second connection control modules can send to the other of said connection control modules a link request message indicating that a connection is to be made between said first and second physical devices;
    whereby both of said first and second connection control modules are included within said switching node and each handle a half call and then communicate with one another to connect their respective half calls.

2. The switching node according to claim 1, wherein said first connection control module communicates with at least one other service control module of said switching node.

3. The switching module according to claim 1, wherein said service request message indicates that at least one of a predetermined type of physical device drivers is needed for establishing a connection pertaining to a call said first service interface generates said first device interface in response to said first service request message.

4. The switching node according to claim 3, wherein said first device interface module transmits a resource request message to an associated resource manager module included in said switching node, and said associated resource manager module selects a physical device driver corresponding to said first physical device from a plurality of physical device drivers of said predetermined type and included in or coupled to said switching node based upon said resource request message.

5. The switching node according to claim 4, wherein said first physical device interface module activates said associated physical device driver, and confirms said activation to said first service interface.

6. The switching node according to claim 5, wherein said first service interface confirms said activation to said first service control module.

7. The switching node according to claim 1, wherein in case said first service request message indicates that a physical device driver of said switching node is to be removed from an existing call connection, said first service interface deleting an existing physical device interface module associated to said physical device driver and included within said connection control module.

8. The switching node according to claim 1, wherein said first service request message indicates that the operation of a physical device driver of said switching node is to be modified, said service interface initiating a state change within an existing physical device interface associated with said physical device driver and included within said connection control module.

9. The switching node according to claim 1, wherein in said first service request message indicates that said at least one other connection control module is involved, and said first service interface communicates with said second service interface.

10. The switching node according to claim 9, wherein upon communication with said second service interface module, said service interface module communicates with a physical device interface module referred to in said first service request message and included in said first connection control module.

11. The switching node according to claim 10, wherein said physical device interface module referred to in said service request message communicates with a second physical device interface referred to in said first service request message and included in said second connection control module.

* * * * *